United States Patent [19]
Holyoak

[11] Patent Number: 5,873,327
[45] Date of Patent: Feb. 23, 1999

[54] SYSTEM AND METHOD FOR CULTIVATING AMPHIBIANS IN CAPTIVITY

[76] Inventor: Hugh Kenneth Holyoak, P.O. Box 449, Alapaha, Ga. 31622

[21] Appl. No.: 847,882

[22] Filed: Apr. 28, 1997

[51] Int. Cl.$^6$ ..................................................... A01K 61/00
[52] U.S. Cl. .............................................................. 119/416
[58] Field of Search .................................... 119/204, 205, 119/206, 215, 216, 217, 234, 236, 251, 252, 200, 201, 203, 213, 219, 224, 225, 248, 247, 269

[56] References Cited

U.S. PATENT DOCUMENTS

| | | | |
|---|---|---|---|
| 3,192,899 | 7/1965 | Lucey et al. | 119/214 |
| 3,685,489 | 8/1972 | Day et al. | 119/206 |
| 3,696,788 | 10/1972 | Day et al. | 119/205 |
| 4,019,459 | 4/1977 | Neff | 119/3 |
| 4,022,160 | 5/1977 | Lester | 119/51 |
| 4,038,947 | 8/1977 | Lester, Jr. | 119/51 |
| 4,089,298 | 5/1978 | Wilson | 119/201 |
| 4,347,808 | 9/1982 | Lester | 119/51 |
| 4,607,595 | 8/1986 | Busot et al. | 119/213 |
| 4,813,377 | 3/1989 | Riché | 119/3 |
| 5,469,810 | 11/1995 | Chiang | 119/248 |

Primary Examiner—Thomas Price

[57] ABSTRACT

A system and method for commercially raising frogs in a controlled environment is disclosed. The frogs are housed within a plurality of containers stacked in an array within the spaced tiers of a rack. Each container defines a first and second chamber and a ledge about the periphery of the container for suspending one or more panels above the chamber to form a third elevated chamber within the container and is fitted with a screen to prevent the frogs from escaping. Ramps provided within each chamber enable the frogs to travel between chambers and to access the third chamber. When adult frogs are being cultivated in the containers, the first chamber of each container retains water to provide an aquatic habitat for the adult frogs, and the second chamber remains dry. When frogs are being cultivated in their larval form as tadpoles within the containers, both the first and second chambers retain water to maximize the aquatic habitat for the tadpoles. Water is retained within each chamber by a stand pipe connected to a drain in the bottom of each chamber. The water within the chambers is continuously circulated by providing a constant supply of water to one or both of the first and second chambers of the uppermost container in the rack. As the water level exceeds the height of the stand pipe within each chamber, the water flows over the stand pipe and through the drain to the corresponding chamber of the container spaced below in the rack. Water passing through the drain in the chamber of the lower most container in the rack is captured by a drainage system positioned beneath the rack. A feeder can be mounted within each container to automatically discharge feed for the frogs. In addition, an access slot in the lid of each container provides access to the chambers for grading and separating the frogs as they develop, and for cleaning the chambers.

20 Claims, 8 Drawing Sheets

SYSTEM AND METHOD FOR CULTIVATING AMPHIBIANS IN CAPTIVITY

FIELD OF THE INVENTION

This system relates in general to a method and apparatus for the commercial cultivation of amphibians in a controlled environment. More particularly, the invention relates to a method and apparatus for raising frogs in a man-made climate-controlled environment.

BACKGROUND OF THE INVENTION

The cultivation of aquatic creatures confined in structures such as cages and tanks has long been attractive to those wishing to commercially raise and sell fish, frogs, shrimp, and the like. With respect to certain creatures, such cultivation has proven to be a viable and profitable alternative to standard harvesting practices used in these creatures' natural habitat. With other creatures however, and, particularly frogs, cultivation in an artificial environment has been an inefficient and costly endeavor.

The difficulty of raising frogs in captivity is compounded by the fact that a frog has two distinct stages of life. When a frog egg hatches, a frog begins its first stage of life in a larval form known as a tadpole. In its infancy, the tadpole has a tail and external gills, and lives and breathes exclusively under water. As the tadpole grows, legs develop and the size of its tail and gills begins to decrease. Once the tadpole's lungs are sufficiently developed, it is forced to seek the surface of the water in order to breathe air. At this point in time the tadpole enters a second stage of development into an adult frog. In this stage, the frog spends the majority of its time on dry ground.

These two separate stages of development make raising frogs in captivity difficult for several reasons. First, separate environments must be provided for the tadpoles and the adult frogs. Tadpoles can survive only in water while adult frogs require an environment that is both wet and dry. Second, tadpoles and frogs require different food sources. Additionally, if the adult frogs are not separated from the tadpoles early in their development, the adult frogs will tend to feed on the tadpoles themselves.

Once the frogs are separated from the tadpoles, the adult frogs have to be continually graded and separated by size to avoid the problem of cannibalism. Because the tadpoles, and hence the frogs develop at different rates, the continual grading and separating of frogs is time and labor intensive. The frogs differing significantly in size from other frogs raised in a cultivating enclosure have to be individually captured and then moved to a separate enclosure in which frogs of a similar size are held. Due to the inherent mobility of frogs, this can be a difficult task.

Frogs also become increasingly stressed in the continued presence of man. Excessive human contact with frogs in cultivation can result in disruptive feeding patterns and reproductive cycles among the frogs, which in turn results in smaller frogs and a decreased frog population at harvest time. Moreover, the frogs are susceptible to injury during the grading and separating process. The frogs will inevitably attempt to evade capture, and as a result will often jump into the walls and lids of cultivating enclosures presently being used to raise frogs in captivity.

The above-mentioned inherent characteristics of frogs create competing interests for commercial breeders. The cultivating enclosures need to be small enough to facilitate the rapid capture of frogs during the grading and separating process, and at the same time must be large enough to house a sufficient number of frogs in order to make commercial cultivation economically feasible. In addition, because frogs are susceptible to disease in captivity, the cultivating enclosures should be easily accessible for regular cleaning and at the same time be constructed in such a manner that prevents the frogs from escaping during the cleaning process.

In order to maximize the growth rate and reproduction rate of frogs in captivity, certain climate and light conditions are necessary. Frogs grow at a maximum rate when the surrounding temperature conditions range from approximately 70° to 80° Fahrenheit. A frog's metabolism slows as temperatures fall below 70° Fahrenheit. When temperatures are in a range of 40° to 50° Fahrenheit, the frogs enter a state of hibernation and their growth rate stops. In order to reproduce, frogs generally require approximately 12 hours of daylight and 12 hours of night. Thus, to enable frogs to lay eggs and thus reproduce throughout the entire year, these conditions must be simulated in a controlled environment.

Accordingly, it can be seen that the need exists to provide a method and apparatus for cultivating frogs which maximizes the number of frogs raised to full maturity while minimizing the frogs' exposure to human contact. The need also exists to provide a method and apparatus for cultivating frogs in captivity in a controlled environment while minimizing the labor and costs associated with maintaining the controlled environment.

SUMMARY OF THE INVENTION

Briefly described, the present invention comprises a system and method for commercially raising frogs to full maturity in a controlled environment. The system includes a water supply line, a plurality of containers removably stacked in an array one above the other on the spaced tiers of a container rack, and a drainage system positioned beneath the rack. The system will be housed in a climate controlled structure having a lighting system capable of simulating day and night conditions, as well as for controlling temperatures. Each container has a bottom from which a side wall extends upwardly to an open top, and a partition within the container defining first and second chambers within the container. Each chamber includes a drain in the bottom of the container with a hollow stand pipe extending vertically upward into the chamber from the drain. In addition, each chamber includes at least one ramp or similar structure which enables the frogs within the container to move freely between the first and second chambers. The ramp or other structure also allows the frogs to exit the water to prevent drowning.

Each container of this system can be configured for the cultivation of frogs in both the larval and adult stages of development. In either case, a strainer is positioned over and surrounds each stand pipe mounted to the chamber bottoms to allow water to pass through to the stand pipes, and to prevent the frogs from clogging the stand pipes, and thus the drains.

When the containers are being used to raise adult frogs, the first chamber within each container is filled with water, and a screen is secured to and extends across the open top of the container to prevent frogs in the chambers from escaping. When at least two of the containers are vertically stacked with respect to one another on the rack, water is continuously fed into the first chamber of the uppermost container via a water supply line. Once the water level within the first chamber of the uppermost container exceeds the height of the stand pipe, the water spills over the upper rim of the stand pipe and is passed out of the container through the drain in the bottom of the container. The water passing through the drain then falls into the first chamber of the container positioned on the rack below the first container causing the water level to rise and spill over the stand pipe. As water is continuously added to the first chamber of the uppermost container, the water will be passed through each of the first chambers in the rack in turn and will be captured by a drain beneath the rack. This continuous flow of water constantly circulates the water within the containers while using a minimal amount of water. In addition, water borne medication for the frogs and cleaning agents for the containers can be supplied to the first chamber of the uppermost container and will be passed thusly to each of the frogs and containers in the rack.

The frogs can freely move between the first chamber and the second dry chamber by using the ramp. The ramp or other structure enables the frogs to cross over the partition separating the first and second chambers of the container. A mechanical feeder is positioned within the second chamber of each container to provide food for the frogs. The feeder incorporates a vibrating mechanism which sporadically discharges food pellets. Generally, frogs are only attracted to live feed. However, the motion of the food pellets as they are discharged from the feeder entices the frogs to consume the pellets. A small percentage of live feed is also supplied to the frogs to provide them with nutrients presently unavailable in commercial feed. Additionally, florescent dye can be added to the commercial feed pellets to further attract the frogs' attention. Black lights mounted within the controlled environment will illuminate the dye in the feed during periods of limited visibility.

As the adult frogs grow over time, efficient grading and separating of the frogs is made more economical as a result of the close proximity and small size of the containers. The arm of an individual is inserted into the container through an access slot or panel provided in the lid to allow capture of the frogs. Because of the limited size of the containers, the arm of an average sized person can easily move about the entire interior surface of the containers.

In like fashion, a single individual can perform a thorough cleaning of several containers while remaining in the same general position. To affect this cleaning, the water supply is turned off and the strainers and stand pipes are removed from each chamber via the access slots in the lid to allow water to drain from the container. Auxiliary strainers in the bottom of each drain prevent the frogs from escaping during this process. Once the stand pipes have been removed, the strainers are reinserted over the drains to prevent the frogs from clogging the drains, and cleaning can begin while the frogs remain in the containers. The containers can be cleaned manually using standard hoses positioned near the racks, or automatically by fully opening the valves controlling the water supply line. In either case, a natural organic disinfectant should be applied to the interior walls of each chamber to control the bacteria, algae, fungus and other organisms detrimental to the frogs' health. When cleaning is complete, the stand pipes are reinstalled and water is again supplied to and permitted to fill the uppermost container, and the remaining containers in turn.

When the containers stacked within the rack are configured to cultivate tadpoles, water is supplied to both chambers within the container in order to maximize the growing area, and thus the number of tadpoles that can be raised in any one container. In this embodiment of the system, water is continuously supplied to both the first and second chambers of the uppermost container in the rack. As the water levels within the first and second chambers exceed the height of the respective stand pipes, overflow water passes through the drains in the first and second chambers into the first and second chambers, respectively, of the container below. In this way, water is continuously circulated through the first and second chambers of each container supported on the rack. The two chambers of the containers of this embodiment are drained and cleaned in the same manner as described above with respect to the first embodiment of the invention. The feeder, however, is not a necessary element of this embodiment as tadpoles are fed different food than frogs, and motion of the food is not necessary to attract the tadpoles' attention.

To effectively cultivate tadpoles, an elevated third chamber can be formed within the container above the first and second chambers. The third chamber is recommended when cultivating adult frogs to provide additional dry surface area within the container, thereby maximizing the number of frogs being raised, but it is not required. Removable plexiglass panels having openings over the ramps within each chamber provide an accessible dry surface for the tadpoles that transform into adult frogs. During grading and separating, these frogs can be easily removed from the top of the plexiglass panels and moved to containers configured to cultivate frogs of similar size.

Accordingly, it is an object of the present invention to provide an improved system and method for cultivating frogs in a climate and light-controlled environment that maximizes the number of frogs being raised to maturity while minimizing the overall size of the growing environment.

Another object of the invention is to provide an improved system and method which enables frogs to grow and reproduce at a maximum rate throughout the entire year.

An additional object of the present invention is to provide an improved system and method for cultivating large numbers of frogs to maturity while minimizing the use of natural resources such as water.

Yet another object of the invention is to provide an improved system and method for easily grading and separating frogs by size to reduce instances of cannibalism.

A further object of the present invention is to provide an improved container that can be easily adapted to raise frogs in both the larval and adult stages of development, and that can be easily transported, cleaned and maintained.

These and other features, objects, and advantages of the invention will become more apparent upon review of the detailed description set forth below, taken in conjunction with the accompanying drawings, which are briefly described as follows.

DETAILED DESCRIPTION OF THE PREFERRED EMBODIMENTS

Figure 1:
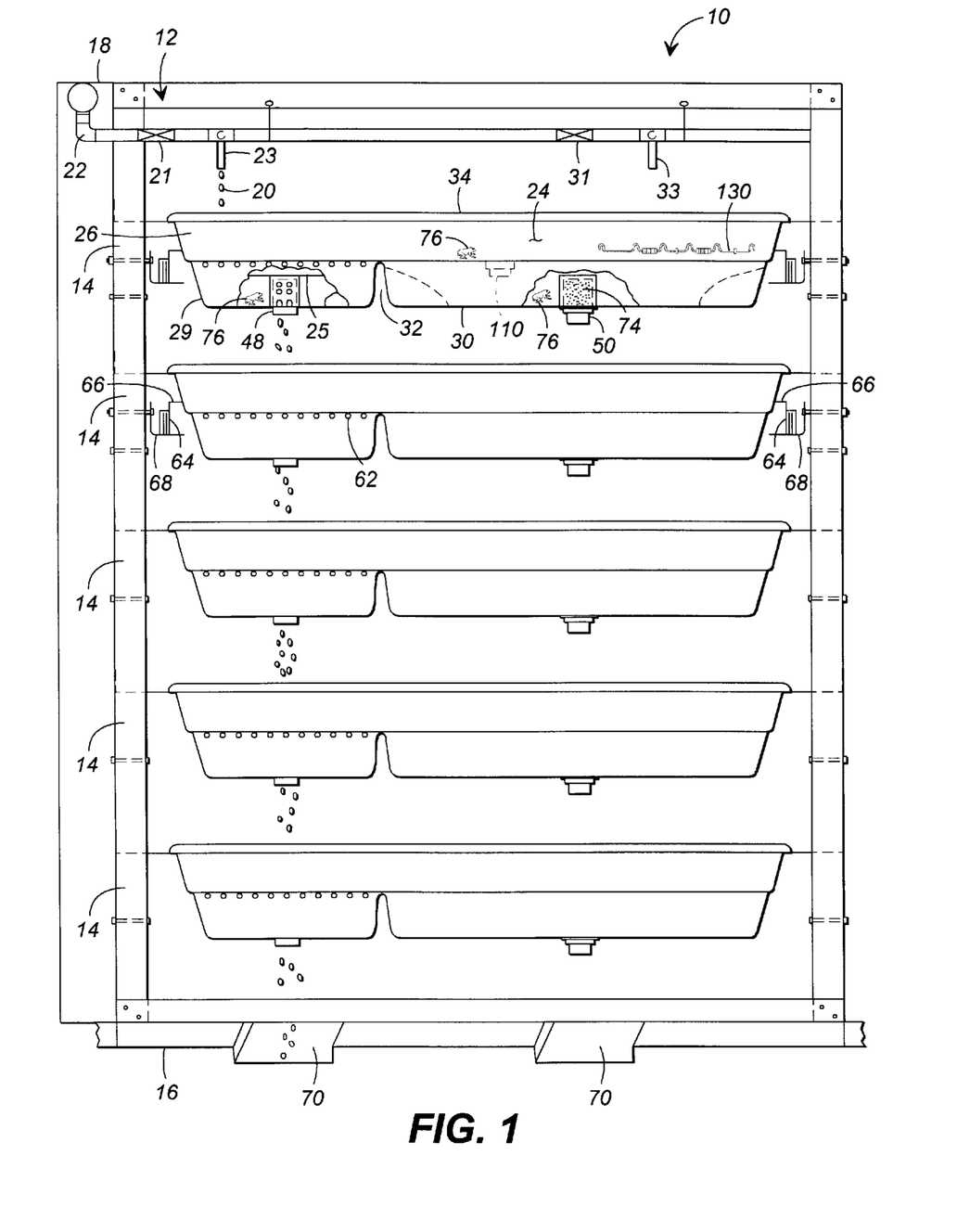
FIG. 1 is a front elevational view of a first embodiment of the system for cultivating frogs of the present invention used to cultivate adult frogs.

Referring now to the drawings, in which like reference characters indicate like parts throughout the several views, numeral 10 of FIG. 1 illustrates a first embodiment of the frog cultivating system of the present invention housed within a controlled environment. A vertical rack 12 having a vertically spaced series of tiers 14 is positioned between the floor 16 and ceiling 18 of a temperature and climate controlled environment. Water 20 for the cultivating system 10 is supplied by a water supply line 22 suspended beneath the ceiling 18. Each tier 14 supports a generally rectangular container 24 having side walls 26 and 27, end walls 28 and 29, a bottom wall 30 (FIG. 4) with a partition 32 defining a first or small chamber 36 and a second or large chamber 38 within the container. The container is shown in FIG. 1 with an open top 34.

Figure 4:
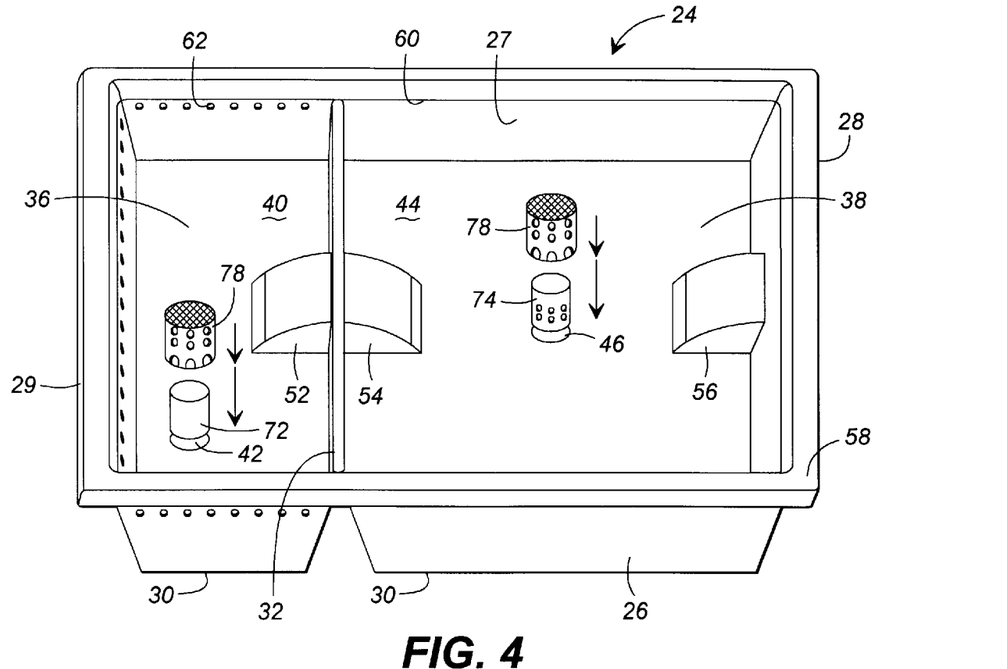
FIG. 4 is a top perspective view of the container configured for use in the system of FIG. 1.

As shown in FIG. 4, the interior of the container 24 is separated into two distinct chambers by the partition 32 extending between front side wall 26 and rear side wall 27 of the container. The bottom surface 40 of the small chamber 36 has a drain opening 42 defined therein and bottom surface 44 of the large chamber 38 has a drain opening 46 defined therein. Each drain opening 42 and 46 opens to an auxiliary drain strainer 48 and 50 (FIG. 1), respectively, depending from bottom wall 30 of the container. The small chamber 36 is provided with a ramp 52 that slopes downwardly from the partition 32 to bottom surface 40. Large chamber 38 is provided with a ramp 54 that also slopes downwardly from the partition, toward bottom surface 44, as well as an opposed ramp 56 that slopes downwardly from end wall 28 toward bottom surface 44. Each container 24 is preferably constructed of plastic and is molded to form a hollow rim which defines the periphery of open top 34. Container 24 is preferably white in color so that food within the container can be easily seen by the frogs. A ledge 60 is provided along the side walls 26, 27 and end walls 28, 29 within the container 24 between the partition 32 and the rim 58. Ledge 60 is canted slightly to slope toward end 29 of the container 24. A plurality of overflow apertures 62, defined in side walls 26, 27, and end wall 29 lie in a common horizontal plane slightly beneath the ledge 60 of the container 24.

Referring again to FIG. 1, each container 24 is slid into one of the tiers 14 within the rack 12 in a spaced vertical array with one container situated directly above the other container and so on from floor 16 to ceiling 18. Wheels 64 mounted to the end walls 28, 29 of container 24 by mounting brackets 66 roll along elongate tracks 68 extending from the rack to facilitate easy insertion and removal of the containers 24. Drainage channels 70 are provided in the floor 16 and are positioned beneath the auxiliary drain strainers 48 and 50 of the bottom container 24 within the rack 12 and are sloped to carry water and debris from the frog culture 10 out of and away from the controlled environment.

Figure 10:
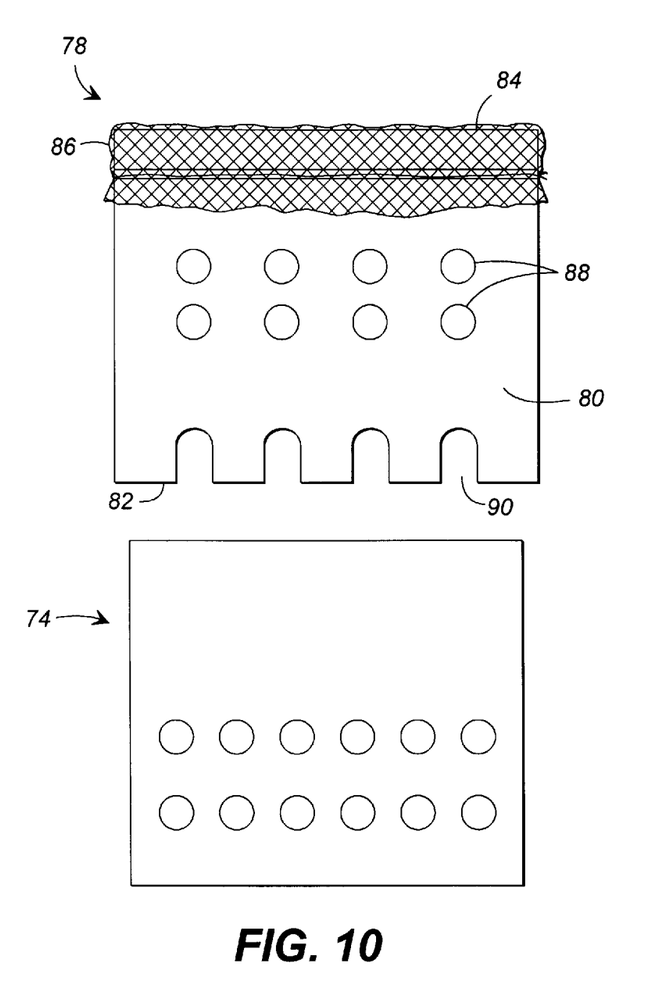
FIG. 10 is a side elevational view showing the detail of the stand pipe and strainer mounted on the drains of the container.

The first embodiment of the frog culture shown in FIG. 1 is configured to cultivate mature frogs and thus requires both a wet and a dry environment. Referring to FIGS. 1 and 4, this is achieved by fitting drain opening 42 with a non-perforated hollow stand pipe 72 extending upwardly from and sealed on bottom surface 40 and by fitting drain opening 46 with a perforated hollow stand pipe 74 extending upwardly from and sealed on bottom surface 44. Frogs instinctively seek out tight crevices, thus each stand pipe 72 and 74 is surrounded by a perforated strainer 78. The details of the strainer 78 are illustrated in FIG. 10, in which the strainer is shown positioned above the perforated stand pipe 74. The strainer comprises a hollow tube 80 with an open bottom 82 and a covered top 84. The top 84 is preferably covered with a nylon mesh netting which is secured to the tube 80 by a clamp 86. Tube 80 includes a plurality of spaced upper apertures 88 and lower apertures 90. The strainer 78 is sized and shaped to be slidably received over the non-perforated stand pipe 72 and the perforated stand pipe 74 in order to allow water to pass therethrough while keeping frogs within the container.

Both the stand pipes 72 and 74 and the strainers 78 are snapped into engagement with a spaced circumferential groove (not shown) defined within the drain openings 42 and 46 formed by the connection of the auxiliary drain strainers 48 and 50 to the bottom wall 30 of the container 24. The connection forms a water-tight seal between the stand pipes 72 and 74 and the drain openings 42 and 46, respectively.

Figure 6:
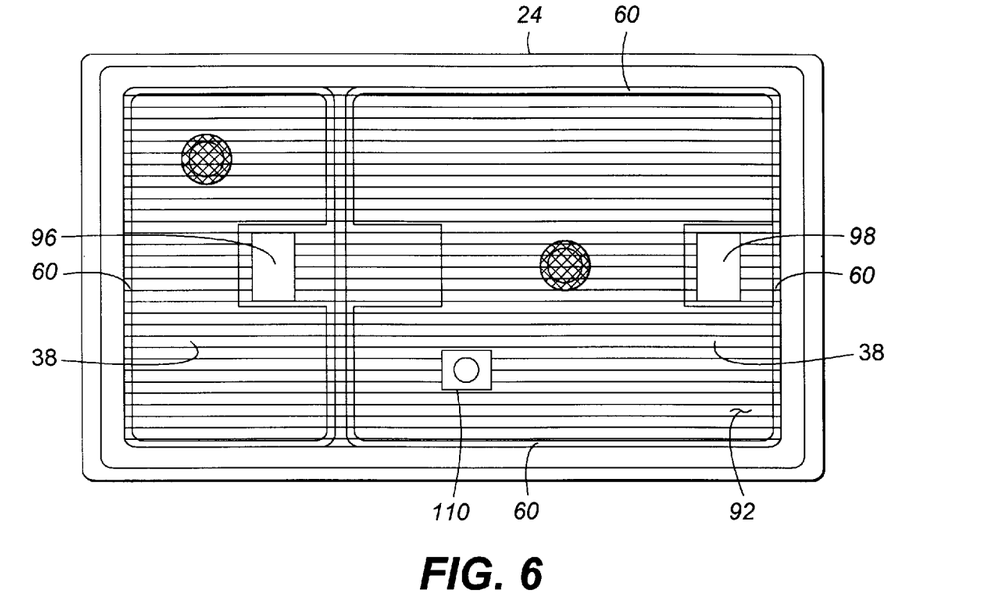
FIG. 6 is a top plan view of the container showing the ramps thereof supporting the plexiglass panels received thereon.
Figure 7:
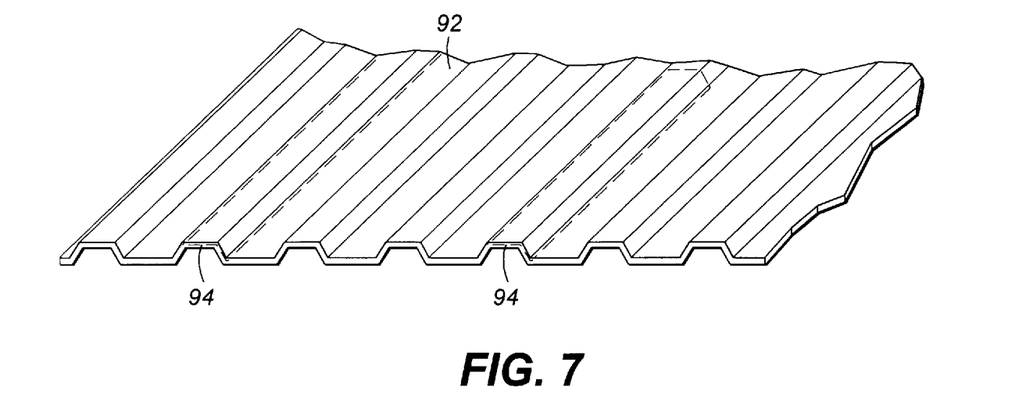
FIG. 7 is a front perspective view of a partial cut-away portion of the plexiglass panels used to form the elevated third chamber within the container as shown in FIG. 6.

As shown in FIG. 6, a series of overlapping panels 92 are held above and enclose the chambers 36 and 38 on ledge 60 formed in the container 24 to form an elevated third chamber 37 (FIG. 1) within the container 24. Panels 92 are constructed of clear plexiglass and are corrugated so that they can be interlocked with adjacent ones of panels 92 as shown in FIG. 7 by reference numeral 94. The overlap points 94 provide added support and stability for the panels. These panels are not necessary; however, when used they provide additional surface area within the container and allow for a maximum number of frogs within a single container 24. Panels 92 define access openings 96 and 98 centrally positioned within the container 24 such that access opening 96 is positioned over ramp 52 and access opening 98 is positioned over ramp 56. These openings provide the frogs 76 (FIG. 1) with access to both chambers, as well as the elevated chamber 37 formed by the panels 92.

Figure 8:
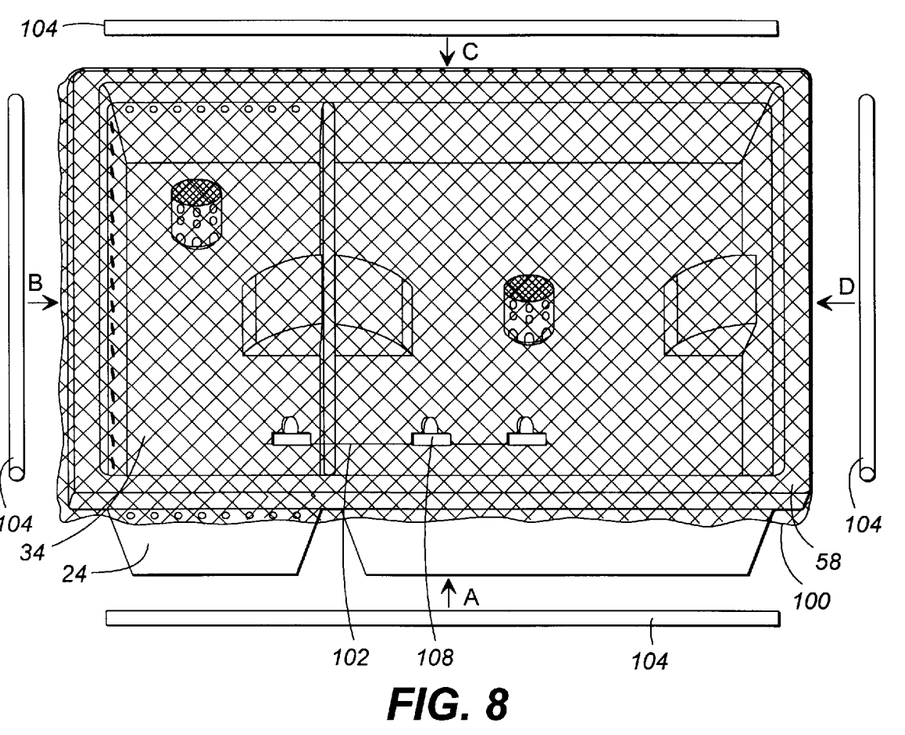
FIG. 8 is a top perspective view of the container showing the attachment of a screen across the open top thereof.
Figure 9:
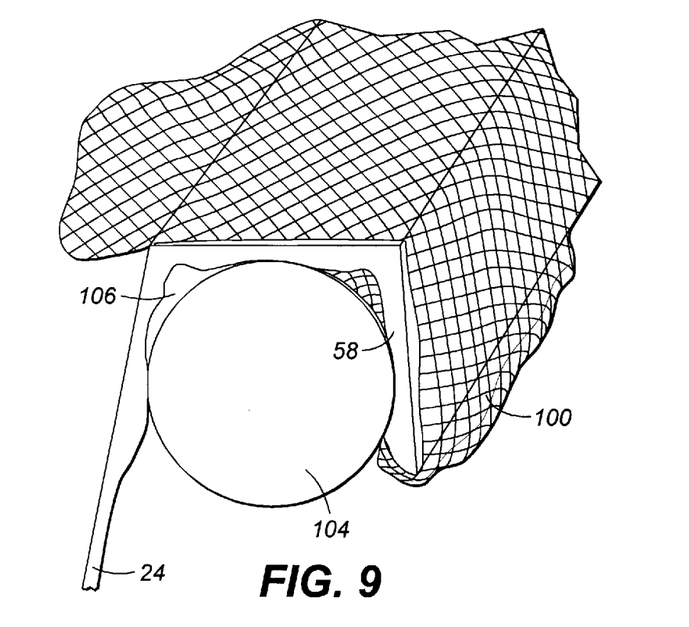
FIG. 9 is an exploded partial side perspective view of the container showing the attachment of the screen to a portion of the container rim.

To contain the frogs 76 within the container 24, a screen 100 is positioned across and covers the open top 34 of container 24 as shown in FIG. 8. Screen 100 is preferably constructed of nylon mesh netting that is sized to extend over the peripheral rim 58 of the container 24 although a metallic mesh screen may also be used if so desired. To secure the net to the open top 34 of the container 24, the net is stretched taut and wrapped over and under the rim 58. Bars 104, preferably constructed of PVC or any other rigid plastic material are then moved in the direction of arrows A, B, C and D, respectively, until they snap into a channel 106 defined by the rim 58 of container 24. As seen in FIG. 9, screen 100 is held in position within channel 106 by being wedged between one of the bars 104 and rim 58. The bars 104, and thus the screen 100 can be easily removed with limited pulling force on the screen adjacent the bottom of the rim 58. An access panel 102 (FIG. 8) fabricated into the screen 100 provides accessibility to both chambers 36 and 38 of the container 24 while screen 100 is secured to rim 58. Clips 108 enable a user to open and close access panel 102. Other fasteners, for example zippers, or hook and loop fasteners may be used in lieu of clips 108. Although the access panel is shown in FIG. 8 with three clips 108, it is anticipated that the access panel 102 can be larger in which case, additional clips 108 will be used to secure the panel.

Figure 11A:
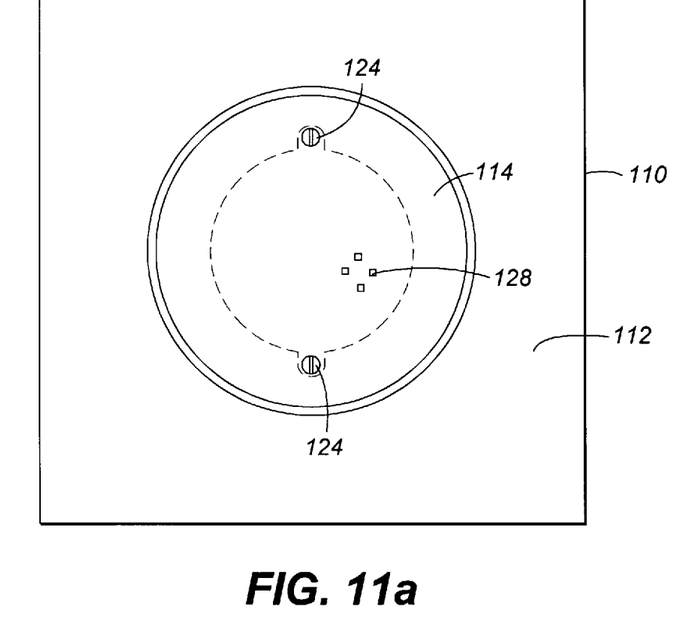
FIG. 11a is a top plan view of the feeder.
Figure 11B:
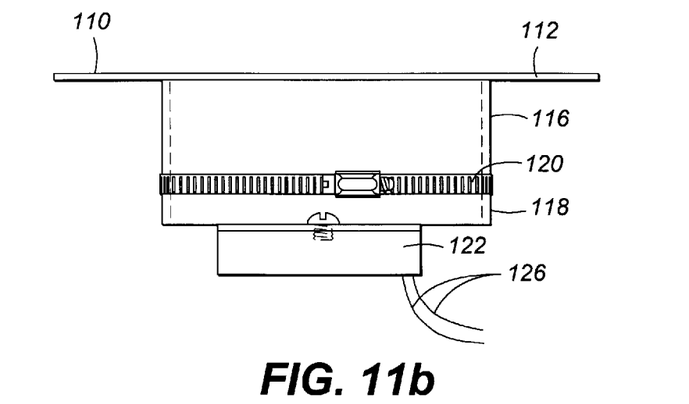
FIG. 11b is a side elevational view of the feeder.

As shown in FIG. 6, a feeder 110 is preferably mounted to one of the plexiglass panels 92 defining the chamber 37 elevated above the large chamber 38 of the container 24. It should be understood that feeder size will vary depending upon the size of the frogs in the container. When larger frogs occupy the container an elongated feeder will be employed. As shown in greater detail in FIGS. 11a and 11b, feeder 110 includes a mounting platform 112 having a generally cylindrical feed opening, a cylindrical feed chamber 116 mounted within the feed opening 114 and extending therebelow, a flexible cover 118 mounted over the bottom of the feed chamber 116 with a hose clamp 120, and an electric vibrator 122 attached to the flexible cover 118. The vibrator 122 is attached to the cover 118 with fasteners 124. Electrical leads 126 from the vibrator are connected to a 12-volt transformer (not shown) drawing current from a standard 115-volt power source (not shown) in order to reduce the shock hazard to the frogs. Vibrator 122 is provided with a timer (not shown) which automatically activates the vibrator at desired time intervals to automatically discharge non-living commercial feed 128 stored within feed chamber 116 a nd dispenses through feed opening 114. The motion of the feed 128 being discharged form the feeder 110 entices the frogs to eat the feed. In the event panels 92 are not installed within container 24, feeder 110 can be mounted within large chamber 38. Fluorescent dye (not shown) can be added to the feed to further entice the frogs. Fluorescent lights 19 can be activated when desired to illuminate the fluorescent dye. In order to expedite filling of the feeder with feed, a funnel (not shown) can be mounted within the container above the feeder.

Figure 12:
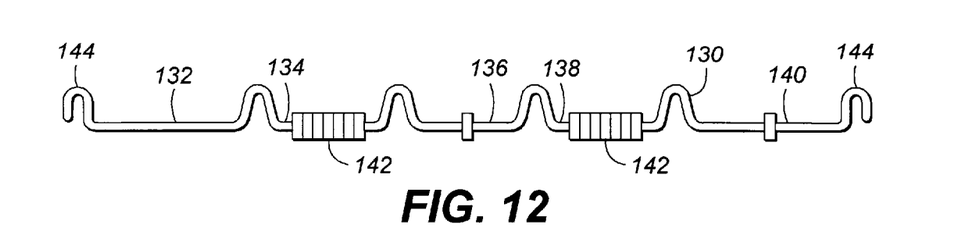
FIG. 12 is a side elevational view of a counting apparatus used to track the number of frogs within a container.

A counting device 130, shown in FIG. 12, can be mounted on container 24, preferably on front side wall 26 to track the number of living frogs within a single container 24. Counting device 130 can be constructed from a simple wire rod formed into a number of distinct sections 132, 134, 136, 138, and 140 by bends in the rod. Discs or washers 142 positioned in sections 134 and 138, for example, are slid along rod 130 into section 136 to count live frogs, and into sections 132 and 140 to count deceased frogs removed from the container. Counting device 130 is preferably mounted to front side 26 of container 24 at its end tabs 144 using fasteners such as screws.

In operation, a plurality of frog cultivating systems 10 are vertically stacked and arrayed in rows with aisles therebetween within an enclosure, for example a climate controlled room. To maximize frog growth and reproduction, the enclosure should be maintained at a temperature of between 70° Fahrenheit and 80° Fahrenheit. A lighting system 19 is set to simulate 12 hours of daylight and 12 hours of night conditions. Valve 21 on water supply line 22 is opened such that nozzle 23 suspended above small chamber 36 of the uppermost container 24 within the rack 12 provides water 20 to the small chamber. Small chamber 36 fills with water 20 (FIG. 1) to a maximum water level 25 determined by the height of the non-perforated stand pipe 72 sealing the drain opening 42 in the bottom wall 30 of container 24. As water 20 is continuously supplied to the small chamber 36 via nozzle 23 and exceeds water level 25, the water passes through the strainer 78 and over the top of the stand pipe 72. This water then passes through the auxiliary drain strainer 48 attached beneath drain opening 42 and streams into small chamber 36 of the container 24 located beneath the uppermost container 24 in the rack 12.

Figure 2:
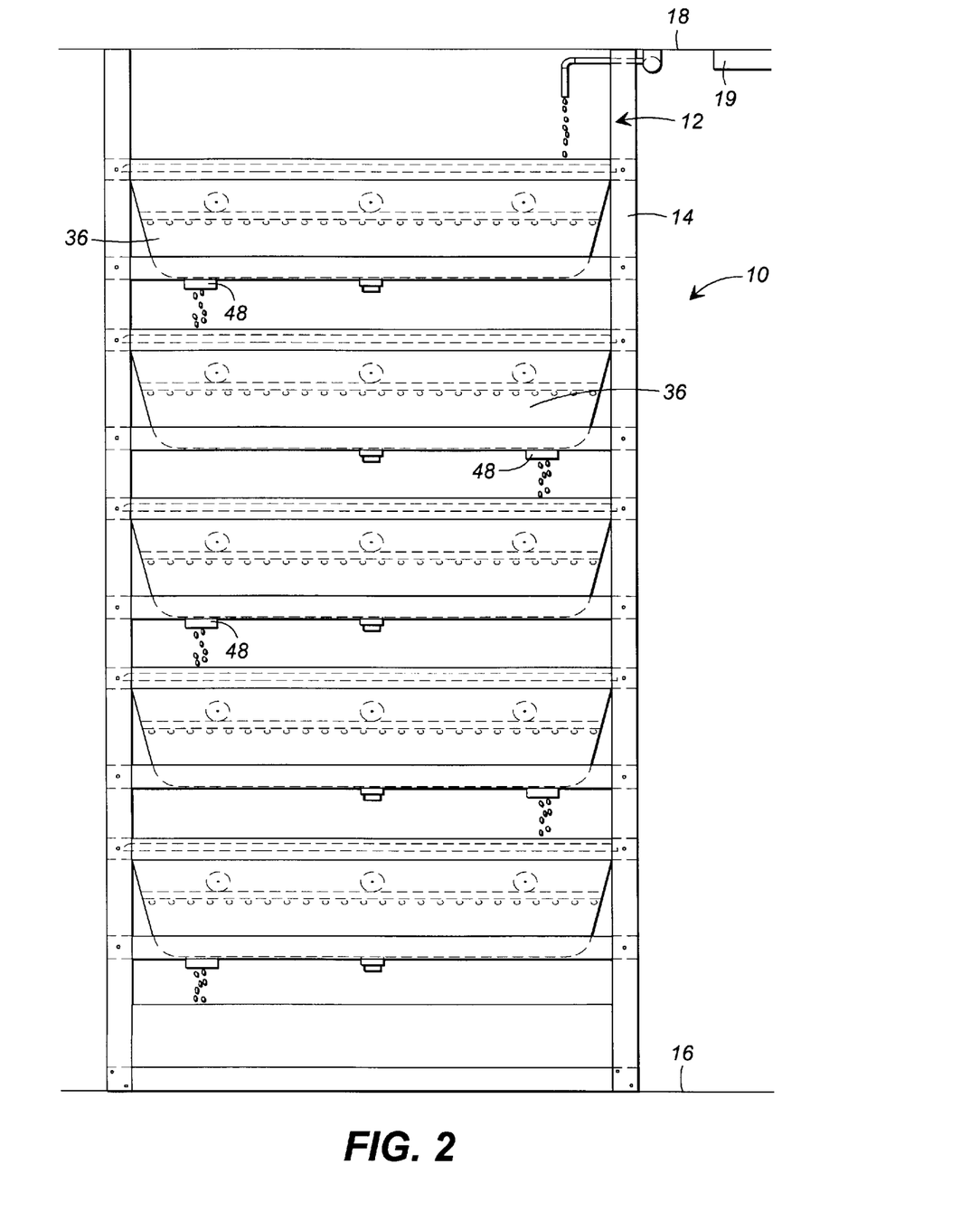
FIG. 2 is an end elevational view of the system of FIG. 1.

Eventually, water 20 passes through drain strainers 48 in each of the containers 24 within the tiers 14 of rack 12 and into the drainage channel 70 defined within floor 16 beneath the rack 12. The slope of the drainage channel 70 carries the water 20 and any waste out of and away from the controlled environment. As seen from the end view of the rack 12 in FIG. 2, drain openings 42 and auxiliary drain strainers 48 are alternately positioned from the front to the rear of small chamber 36 in succeeding tiers 14 within the rack 12. Although not shown, it is envisioned that the drain openings 46 and drain strainers 50 can be offset as well. This staggering of the drains optimizes water circulation within the small chambers 36 of the containers 24. When panels 92 are positioned on ledge 60 within the container to form a third elevated chamber 37, water passing through the auxiliary drain strainer 48 of the container stacked above falls onto the panel 92 and is carried along the corrugation toward end wall 29 where it falls into small chamber 36 below. Although not shown in the drawings, it is envisioned that the panels 92 can be fabricated with openings (not shown) that align with the auxiliary drain strainers 48 and 50 of the container above to enable water falling from the strainers to pass directly through the panels 92 to the chambers 36 and 38 below.

The perforated strainers 78 positioned over the stand pipes 72 within small chambers 36 are designed to prevent blockage of the drain openings 42 of the containers. In the event, however, perforated strainers 78 become blocked, overflow apertures 62 will allow water 20 to pass from the containers 24 and will prevent water 20 from entering the large chambers 38 of the containers.

Frogs 76 (FIG. 1) can freely enter and exit the water 20 in small chamber 36 to moisten their skin using ramp 52. In order to feed, frogs 76 exit small chamber 36 by climbing onto the ramp 52. Access opening 96 allows the frog 76 to climb onto the plexiglass panels 92 where the feed 128 is sporadically dispersed by the feeder 110. Because the plexiglass panels 92 are sloped in the direction of the small chamber 36, water dripping off of the frog is carried back to small chamber 36. In this way, the feed area on the plexiglass panels 92 covering the large chamber 38 is kept dry. A frog 76 can enter the large feed area 38 through access opening 98 above the ramp 56 in large chamber 38. A second feeder (not shown) can also be located within the large chamber 38 below the panels 92 to provide additional food for the frogs 76. Screen 100 secured over the top of the containers 24 prevents the frogs from escaping.

Aisles (not shown) between the rows of racks 12 allow an individual to service and maintain the containers 24 with a minimum amount of labor in a relatively short period of time. When necessary, the frogs are graded and separated by size. The individual removes the clips 108 or other fastening devices from the access panel 102 in the screen 100, and reaches with one or both hands through the access panel 102 to capture the frogs being separated. Preferably, this is done during periods of limited lighting within the controlled environment. In this way, disturbance of the frogs is minimized, thus reducing stress and injury to the frogs. When it is necessary to gain access to frogs located beneath the plexiglass panels 92, one or more of the panels 92 can be easily lifted and placed on the remaining panel or panels 92 without removing the screen 100. This construction, in combination with the small size of each container 24, enables an individual to reach all areas of both the large chamber 38 and small chamber 36 without removing the screen 100. Typically, the frogs being separated can immediately be placed in an adjacent container 24 having similarly sized frogs. When the frogs within a container 24 are sufficiently sized for harvest, the container 24 can be easily slid out of the rack 12 and carried to a harvesting site (not shown).

The stacking of the containers 24 within the rack 12 also provides for the efficient and economical cleaning of the containers 24 and for medicating the frogs. Frogs are highly susceptible to disease and thus often require medication while in captivity. Because of the inherent mobility of frogs, administering medication to individual frogs is highly impractical. Using the frog cultivating system 10, a water borne medication (not illustrated) can be added to the small chamber 36 of the uppermost container 24 so that the medication is then automatically dispersed throughout the small chamber 36 of each container 24 within the rack 12. In this way, all frogs within a single rack can be medicated with a single application. Similarly, a natural organic disinfectant can be added to the small chamber 36 of the uppermost container 24 to quickly clean the small chambers 36 of each container 24 within the rack 12. In this way, fewer thorough cleanings of the containers 24 are necessary, thus reducing labor costs.

The large chambers 38 of each container 24 within the rack 12 can also be automatically cleaned by providing water to the large chamber 38 of the uppermost container 24 via nozzle 33 suspended above large chamber 38 of the uppermost container 24. Control valve 31 which is typically closed in this embodiment of the system is opened to provide sufficient water flow to the nozzle 33. The natural organic disinfectant is then added to the large chamber 38 of the uppermost container 24. Perforated stand pipe 74 allows the water/disinfectant solution to pass through auxiliary strainer 50 in each large chamber 38 in turn thereby cleaning each large chamber 38 within the rack 12. After several minutes have passed, control valve 31 is again closed and the remaining fluid within each large chamber 38 drains out of the auxiliary drain strainers 50. The bottom surface 44 of each large chamber 38 is sloped toward the drain opening 46 to facilitate the complete draining of each large chamber 38.

On at least a weekly basis, valve 21 is closed and the water supply to small chamber 36 of the uppermost container 24 is stopped. The non-perforated stand pipe 72 within the small chamber 36 of each container 24 in the rack is removed and the strainer 78 is re-secured over drain openings 46 in each small chamber 36 in order to drain the small chambers 36. Bottom surface 40 of each small chamber 36 is sloped toward the drain opening 42 to facilitate draining. Once the small chambers 36 of each container 24 are completely drained, the interior surface of each container 24 is completely cleaned with a natural organic disinfectant. Again, this cleaning is performed with the screen 100 secured across the open top of each container 24. Preferably, the uppermost container 24 is cleaned first, with succeeding containers 24 being cleaned thereafter. In this fashion, the disinfectant drains from container to container within the rack 12, thereby conserving the disinfectant. Once each container 24 has been cleaned, both control valves 21 and 31 are fully opened and each container 24 is thoroughly rinsed and allowed to drain. Once drained, the non-perforated stand pipes 72 are re-inserted over drain openings 42 in the small chamber 36 of each container 24 in the rack 12. Control valve 21 is then opened to provide a constant supply of water 20 to the uppermost small chamber 36 in order to circulate water through each of the small chambers of the containers 24 in the rack 12.

Figure 3:
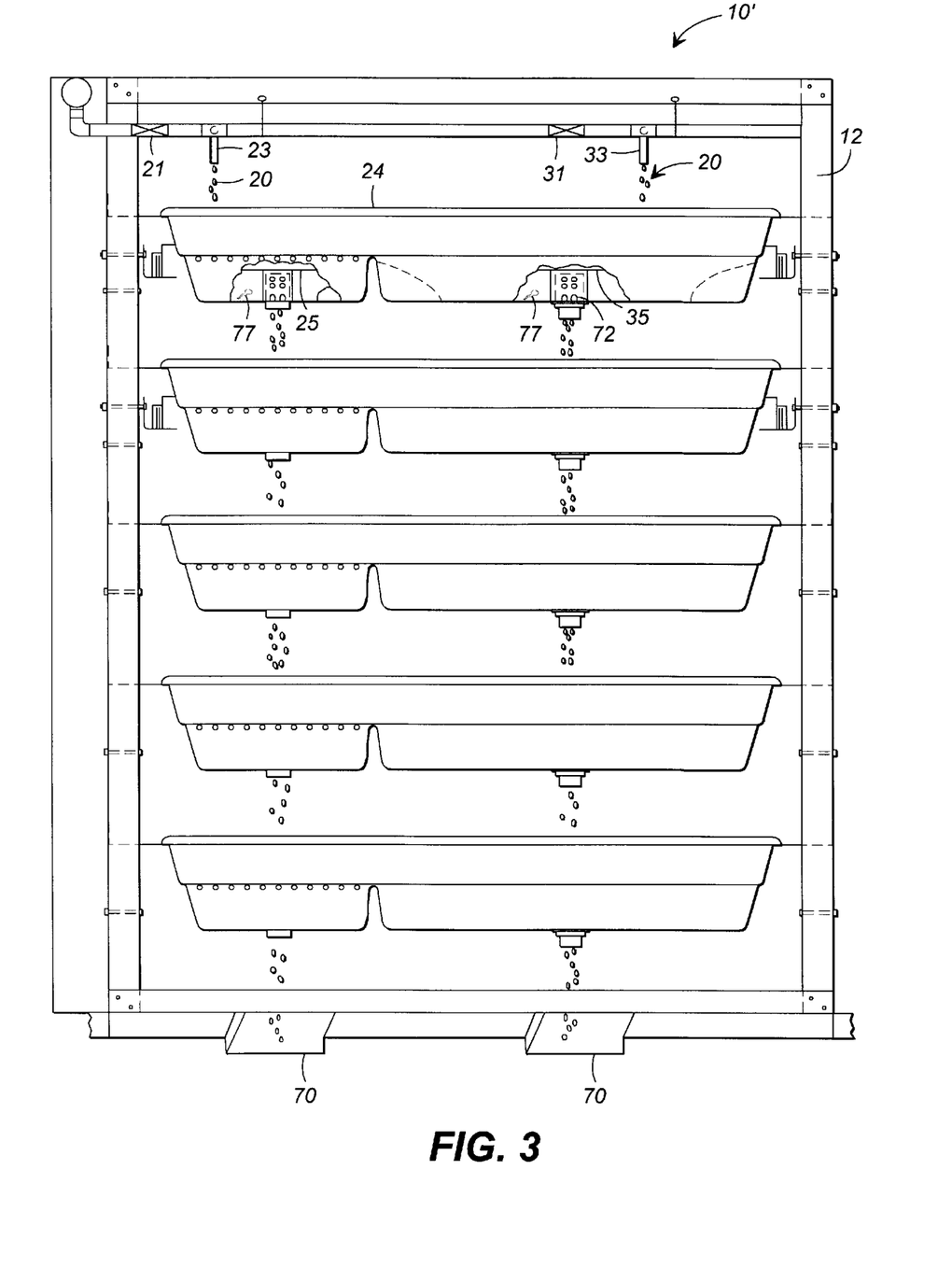
FIG. 3 is a front elevational view of a second embodiment of the system for cultivating frogs of the present invention used to cultivate tadpoles.
Figure 5:
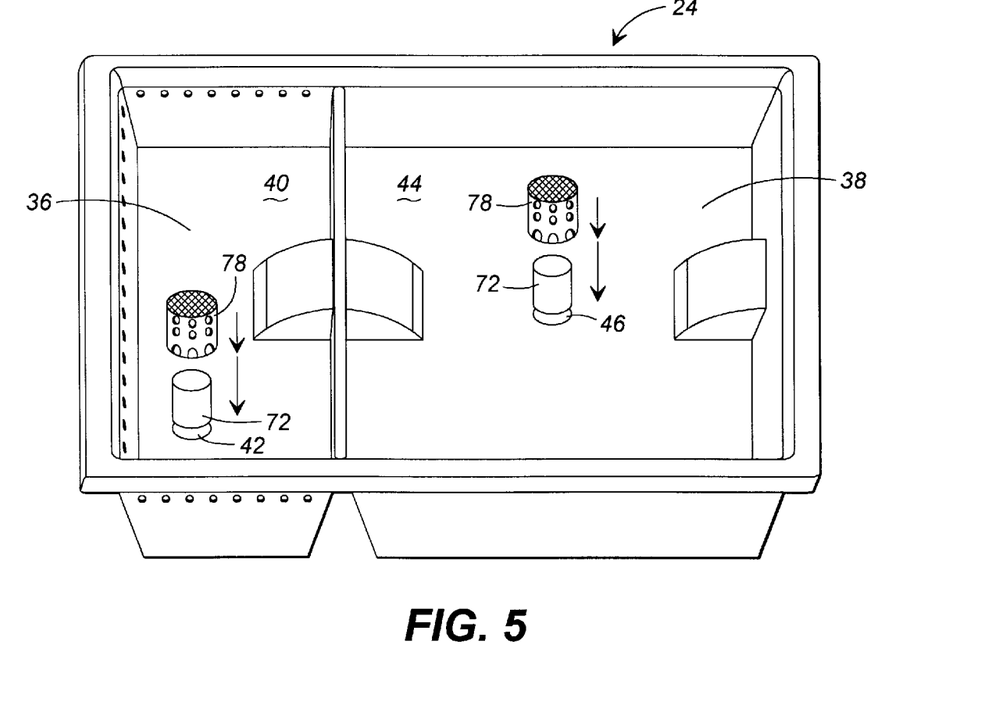
FIG. 5 is a top perspective view of the container configured for use in the system of FIG. 3.

A second embodiment of the frog culture is shown in FIG. 3. This embodiment of the system is configured to cultivate frogs in their larval form as tadpoles, and is thus designed to hold water in both the large chamber 38 and small chamber 36 in order to maximize the number of tadpoles being cultivated. As seen in FIG. 5, the container 24 of frog culture 10' (FIG. 3) incorporates two non-perforated stand pipes 72. The non-perforated stand pipes 72 are sealed on and attached to drain openings 46 within large chambers 38 to enable large chambers 38 to hold water in the same manner as small chambers 36 described above. In operation, control valves 21 and 31 are each opened to provide a continuous flow of water 20 from nozzles 23 and 33, respectively. In this way maximum water level 25 (FIG. 3) is held in the small chambers 36 of each container 24 and maximum water level 35 (FIG. 3) is contained within the large chambers 38 of each container 24. Excess water then drains over each non-perforated stand pipe 72 to continuously circulate water throughout each small chamber 36 and large chamber 38 of the containers 24 within the rack 12.

As the tadpoles 77 (FIG. 3) develop into small adult frogs, they exit the water on ramps 52 and 56 and climb onto the plexiglass panels 92 suspended above the small chamber 36 and large chamber 38. During grading and separating, the small frogs are then captured and moved to containers 24 containing similarly sized small frogs. The tadpoles are fed different food than adult frogs, thus, the feeders 110 incorporating vibrators 122 are not necessary.

The tadpoles can be medicated, and the containers 24 can be disinfected in fashion similar to that described above with regard to the first embodiment of the frog culture 10. In the second embodiment of the frog culture 10, however, both chambers 36 and 38 of each container 24 are automatically medicated and disinfected. When raising tadpoles, however, the containers 24 are drained and thoroughly cleaned at least daily.

While preferred embodiments of the invention have been disclosed in the foregoing specification, it is understood by those skilled in the art that variations and modifications thereof can be made without departing from the spirit and scope of the invention as set forth in the following claims. In addition, the corresponding structures, materials, acts, and equivalents of all means or step plus function elements in the claims below are intended to include any structure, material, or acts for performing the functions in combination with other claimed elements, as specifically claimed herein.

What is claimed is:

1. A system for raising frogs, the system being supplied with water by a water distribution system having at least one control valve and at least one water dispensing nozzle controlled thereby, said system comprising:

an upstanding rack;

a first container disposed on said rack;

said first container having a bottom wall with a continuous upstanding side wall extending about the periphery of said bottom wall, a top rim formed about the periphery of said side wall spaced from said bottom wall, and an upstanding partition extending from and laterally across said bottom wall and being sealed at its ends on said side wall to define a first chamber and a second chamber within said container;

a first drain opening defined in said bottom wall within said first chamber, and a first upstanding stand pipe sealed on said first drain opening;

a second drain opening defined in said bottom wall within said second chamber, and a second upstanding stand pipe sealed on said first drain opening;

a perforated mesh strainer slidably passed about each respective one of said stand pipes;

wherein said first stand pipe is imperforate for defining a maximum water level within said first chamber as water is passed from the at least one dispensing nozzle into said first chamber; and a second container disposed on said rack, said second container being vertically stacked below said first container on said rack;

said second container being constructed substantially similar to said first container with the exception that a first drain of said second container is offset from said first drain of said first container;

wherein water is passed from said first chamber of said first container through said first stand pipe and into said first chamber of said second container for being collected therein and defining the maximum water level within the first chamber of said second container;

and wherein water is passed from out of said first chamber of said second container through said first stand pipe after the maximum water level has been attained in said first chamber of said second container.

2. A system for raising frogs, the system being supplied with water by a water distribution system having at least one control valve and at least one water dispensing nozzle controlled thereby, said system comprising:

an upstanding rack;

a first container and a second container disposed on said rack, said first container being vertically stacked above said second container on said rack;

each said container having a bottom wall with a continuous upstanding side wall extending about the periphery of said bottom wall, a top rim formed about the periphery of said side wall spaced from said bottom wall, and an upstanding partition extending from and laterally across said bottom wall and being sealed at its ends on said side wall to define a first chamber and a second chamber within said container;

each said container further comprising a first ramp extending upwardly from said bottom wall of said first chamber of said container toward the top of said partition, and a second ramp extending upwardly from said bottom wall of said second chamber of said container toward the top rim of said end wall opposed from said partition;

a first drain opening defined in said bottom wall within said first chamber, and a first upstanding stand pipe sealed on said first drain opening;

a second drain opening defined in said bottom wall within said second chamber, and a second upstanding stand pipe sealed on said first drain opening;

a perforated mesh strainer slidably passed about each respective one of said stand pipes;

said first stand pipe being imperforate for defining a maximum water level within said first chamber as water is passed from the at least one dispensing nozzle into said first chamber;

wherein water passes from said first chamber of said first container through said first stand pipe and into said first chamber of said second container for being collected therein and defining said maximum water level within the first chamber of said second container;

and wherein water passes from out of said first chamber of said second container through said first stand pipe after said maximum water level has been attained in said first chamber of said second container.

3. The system of claim 2, wherein said second stand pipe is perforated.

4. The system of claim 2, wherein said second stand pipe is imperforate for defining a second maximum water level within said second chamber as water is passed from the at least one dispensing nozzle into said second chamber of said first container.

5. The system of claim 4, wherein water is passed from said second chamber of said first container through said second stand pipe and into said second chamber of said second container for being collected therein and defining said second maximum water level within the second chamber of said second container, and wherein water passes from out of said second chamber of said second container through said second stand pipe after said second maximum water level has been attained in the second chamber of the second container.

6. The system of claim 2, wherein each said container further comprises a third ramp extending upwardly from the bottom wall of the second chamber of the container toward the top of said partition, said first ramp and said third ramp being aligned with one another on opposite sides of said partition.

7. The system of claim 6, wherein each said container comprising a recessed ledge defined in said side wall intermediate said bottom wall and said top rim, said ledge extending inwardly of the container side wall and being continuously inclined from said second chamber downwardly toward said first chamber, and wherein said partition does not extend to a height above that of said recessed ledge above said bottom wall.

8. The system of claim 7, further comprising at least one elongate panel sized and shaped to be received on said ledge and to extend over both said first and said second chambers.

9. The system of claim 8, further comprising a series of overlapping ones of said at least one elongate panel, said series of panels defining an elevated third chamber above said first and said second chambers, said third chamber being accessible from said first and said third ramps for allowing frogs to pass from said first chamber to said third chamber into said second chamber, and back.

10. The system of claim 2, further comprising respective screens constructed and arranged to respectively enclose the open top of each said container, each screen being removably fastened to said top rim of each said container and having a means for accessing said first and said second chambers formed as a part thereof.

11. The system of claim 2, wherein said first drains of said first chambers of said first and of said second containers, respectively, are offset with respect to one another in the respective bottom walls of said containers.

12. The system of claim 2, wherein each said container further comprises a series of spaced overflow openings defined in said side wall along said first chamber for allowing water to pass from said container in the event said maximum water level is exceeded therein.

13. The system of claim 2, further comprising a vibrating non-living commercial feed dispenser for dispensing feed to frogs positioned within each said container, respectively.

14. The system of claim 2, further comprising a vertically stacked series of at least three of said containers, wherein the first drain within the first chamber in each said container is offset with respect to the first drains of any adjacent containers stacked above and below said container.

15. A method of raising frogs in a frog raising system, the system being supplied with water by a water distribution system having at least one control valve and at least one water dispensing nozzle controlled thereby, said method comprising the steps of:

positioning a first container on an upstanding rack;

positioning a second container vertically below said first container;

passing water from the at least one dispensing nozzle into a first chamber defined in the first container, collecting water therein, and forming a maximum water level in the first chamber of said first container in response thereto;

passing water from the first chamber of the first container through a first stand pipe into a first chamber of the second container positioned vertically below and aligned with the first chamber of the first container, collecting water therein, and forming said maximum water level in the first chamber of the second container in response thereto;

offsetting said first stand pipe with respect to said second standpipe; and passing water from out of the first chamber of the second container through a second stand pipe after said maximum water level has been attained in the second container.

16. The method of claim 15, further comprising the steps of:

passing water from the at least one dispensing nozzle into a second chamber defined in the first container, collecting water therein, and forming a second maximum water level in the second chamber of the first container in response thereto;

passing water from the second chamber of the first container through a third stand pipe into a second chamber of the second container positioned vertically below and aligned with the second chamber of the first container, collecting water therein, and forming said second maximum water level in the second chamber of the second container in response thereto; and then passing water from out of the second chamber of the second container through a fourth stand pipe after said second maximum water level has been attained in the second container.

17. A system for raising frogs, the system being supplied with water by a water distribution system having at least one control valve and at least one water dispensing nozzle controlled thereby, said system comprising:

an upstanding rack;

a first container and a second container disposed on said rack, said first container being vertically stacked above said second container on said rack;

each said container having a bottom wall with a continuous upstanding side wall extending about the periphery of said bottom wall, a top rim formed about the periphery of said side wall spaced from said bottom wall, and an upstanding partition extending from and laterally across said bottom wall and being sealed at its ends on said side wall to define a first chamber and a second chamber within each said container;

a first drain opening defined in said bottom wall within said first chamber of each container, and a first upstanding stand pipe sealed on said first drain opening;

a second drain opening defined in said bottom wall within said second chamber of each container, and a second upstanding stand pipe sealed on said first drain opening;

said first drains of said first chambers and of said second containers, respectively, being offset with respect to one another in the respective bottom walls of said containers;

a perforated mesh strainer slidably passed about each respective one of said stand pipes;

said first stand pipe being imperforate for defining a maximum water level within said first chamber as water is passed from the at least one dispensing nozzle into said first chamber;

wherein water passes from said first chamber of said first container through said first stand pipe and into said first chamber of said second container for being collected therein and defining said maximum water level within the first chamber of said second container;

and wherein water passes from out of said first chamber of said second container through said first stand pipe after said maximum water level has been attained in said first chamber of said second container.

18. A system for raising frogs, the system being supplied with water by a water distribution system having at least one control valve and at least one water dispensing nozzle controlled thereby, said system comprising:

an upstanding rack;

a first container and a second container disposed on said rack, said first container being vertically stacked above said second container on said rack;

each said container having a bottom wall with a continuous upstanding side wall extending about the periphery of said bottom wall, a top rim formed about the periphery of said side wall spaced from said bottom wall, and an upstanding partition extending from and laterally across said bottom wall and being sealed at its ends on said side wall to define a first chamber and a second chamber within each said container;

each said container further comprising a series of spaced overflow openings defined in said side wall along said first chamber for allowing water to pass from said container in the event said maximum water level is exceeded therein;

a first drain opening defined in said bottom wall within said first chamber of each container, and a first upstanding stand pipe sealed on said first drain opening;

a second drain opening defined in said bottom wall within said second chamber of each container, and a second upstanding stand pipe sealed on said first drain opening;

a perforated mesh strainer slidably passed about each respective one of said stand pipes;

said first stand pipe being imperforate for defining a maximum water level within said first chamber as water is passed from the at least one dispensing nozzle into said first chamber;

wherein water passes from said first chamber of said first container through said first stand pipe and into said first chamber of said second container for being collected therein and defining said maximum water level within the first chamber of said second container;

and wherein water passes from out of said first chamber of said second container through said first stand pipe after said maximum water level has been attained in said first chamber of said second container.

19. A system for raising frogs, the system being supplied with water by a water distribution system having at least one control valve and at least one water dispensing nozzle controlled thereby, said system comprising:

an upstanding rack;

a first container and a second container disposed on said rack, said first container being vertically stacked above said second container on said rack;

each said container having a bottom wall with a continuous upstanding side wall extending about the periphery of said bottom wall to define an open top, a top rim formed about the periphery of said side wall spaced from said bottom wall, and an upstanding partition extending from and laterally across said bottom wall and being sealed at its ends on said side wall to define a first chamber and a second chamber within each said container;

screens constructed and arranged to respectively enclose said open top of each said container, each screen being removably fastened to said top rim of each container;

a first drain opening defined in said bottom wall within said first chamber of each container, and a first upstanding stand pipe sealed on said first drain opening;

a second drain opening defined in said bottom wall within said second chamber of each container, and a second upstanding stand pipe sealed on said first drain opening;

a perforated mesh strainer slidably passed about each respective one of said stand pipes;

said first stand pipe being imperforate for defining a maximum water level within said first chamber as water is passed from the at least one dispensing nozzle into said first chamber;

wherein water passes from said first chamber of said first container through said first stand pipe and into said first chamber of said second container for being collected therein and defining said maximum water level within the first chamber of said second container;

and wherein water passes from out of said first chamber of said second container through said first stand pipe after said maximum water level has been attained in said first chamber of said second container.

20. A system for raising frogs, the system being supplied with water by a water distribution system having at least one control valve and at least one water dispensing nozzle controlled thereby, said system comprising:

an upstanding rack;

a first container and a second container disposed on said rack, said first container being vertically stacked above said second container on said rack;

each said container having a bottom wall with a continuous upstanding side wall extending about the periphery of said bottom wall, a top rim formed about the periphery of said side wall spaced from said bottom wall, and an upstanding partition extending from and laterally across said bottom wall and being sealed at its ends on said side wall to define a first chamber and a second chamber within said container;

a vibrating non-living commercial feed dispenser for dispensing feed positioned within each said container;

a first drain opening defined in said bottom wall within said first chamber of each container, and a first upstanding stand pipe sealed on said first drain opening;

a second drain opening defined in said bottom wall within said second chamber of each container, and a second upstanding stand pipe sealed on said first drain opening;

a perforated mesh strainer slidably passed about each respective one of said stand pipes;

said first stand pipe being imperforate for defining a maximum water level within said first chamber as water is passed from the at least one dispensing nozzle into said first chamber;

wherein water passes from said first chamber of said first container through said first stand pipe and into said first chamber of said second container for being collected therein and defining said maximum water level within the first chamber of said second container;

and wherein water passes from out of said first chamber of said second container through said first stand pipe after said maximum water level has been attained in said first chamber of said second container.

* * * * *